US008028338B1

(12) United States Patent
Schneider et al.

(10) Patent No.: US 8,028,338 B1
(45) Date of Patent: Sep. 27, 2011

(54) MODELING GOODWARE CHARACTERISTICS TO REDUCE FALSE POSITIVE MALWARE SIGNATURES

(75) Inventors: Scott Schneider, Santa Monica, CA (US); Kent Griffin, Santa Monica, CA (US)

(73) Assignee: Symantec Corporation, Mountain View, CA (US)

( * ) Notice: Subject to any disclaimer, the term of this patent is extended or adjusted under 35 U.S.C. 154(b) by 459 days.

(21) Appl. No.: 12/241,852

(22) Filed: Sep. 30, 2008

(51) Int. Cl.
*G06F 11/30* (2006.01)
*G06F 11/00* (2006.01)
*G06F 12/14* (2006.01)
*G06F 12/16* (2006.01)
*G08B 23/00* (2006.01)

(52) U.S. Cl. .......................................... 726/24; 713/188
(58) Field of Classification Search .............. 726/22–24; 713/188
See application file for complete search history.

(56) References Cited

U.S. PATENT DOCUMENTS

| | | | | |
|---|---|---|---|---|
| 7,290,282 | B1 * | 10/2007 | Renert et al. ..................... | 726/24 |
| 7,757,292 | B1 * | 7/2010 | Renert et al. ..................... | 726/24 |
| 2007/0180528 | A1 * | 8/2007 | Kane .............................. | 726/24 |
| 2007/0240217 | A1 * | 10/2007 | Tuvell et al. .................... | 726/24 |
| 2007/0240218 | A1 * | 10/2007 | Tuvell et al. .................... | 726/24 |
| 2007/0240219 | A1 * | 10/2007 | Tuvell et al. .................... | 726/24 |
| 2007/0240220 | A1 * | 10/2007 | Tuvell et al. .................... | 726/24 |
| 2007/0240221 | A1 * | 10/2007 | Tuvell et al. .................... | 726/24 |
| 2007/0240222 | A1 * | 10/2007 | Tuvell et al. .................... | 726/24 |
| 2009/0013405 | A1 * | 1/2009 | Schipka ........................... | 726/22 |

OTHER PUBLICATIONS

Peter Buhlmann et al., "Variable Length Markov Chains", The Annals of Statistics, vol. 27, No. 2. Feb. 1999, 32 pages.
Richard Davis et al., "Improved Ensemble Training for Hidden Markov Models using Random Relative Node Permutations", Proceedings of the 2003 APRS Workshop on Digital Image Computing, Feb. 2003, pp. 83-86, Brisbane, Australia.
Jan Grau et al., "VOMBAT: prediction of transcription factor binding sites using variable order Bayesian trees", Nucleic Acids Research, 2006, vol. 34, pp. W529-W533.
Xuan Hoang et al., "An Efficient Hidden Markov Model Training Scheme for Anomaly Intrusion Detection of Server Applications Based on System Calls", Proceedings of the 12th IEEE International Conference on Networks 2004, (ICON 2004), Nov. 2004, pp. 470-474, vol. 2, Singapore.

\* cited by examiner

*Primary Examiner* — Christian LaForgia
(74) *Attorney, Agent, or Firm* — Fenwick & West LLP

(57) ABSTRACT

A set of likelihood values associated with a set of characteristics associated with the set of goodware entities is determined. The set of characteristics is stored in association with the set of likelihood values as a model. A set of relative information gain values associated with the characteristics of the set of characteristics is generated. One or more characteristics are removed from the model responsive to the relative information gain values associated with the one or more characteristics to produce a revised model.

17 Claims, 9 Drawing Sheets

MODELING GOODWARE CHARACTERISTICS TO REDUCE FALSE POSITIVE MALWARE SIGNATURES

BACKGROUND OF THE INVENTION

1. Field of the Invention

This invention pertains in general to computer security and in particular to the development of signatures to accurately identify malware.

2. Description of the Related Art

There is a wide variety of malicious software (malware) that can attack modern computers. Malware threats include computer viruses, worms, Trojan horse programs, spyware, adware, crimeware, and phishing websites. Modern malware is often designed to provide financial gain to the attacker. For example, malware can surreptitiously capture important information such as logins, passwords, bank account identifiers, and credit card numbers. Similarly, the malware can provide hidden interfaces that allow the attacker to access and control the compromised computer.

Security computer systems and software for counteracting malware typically operate by seeking to identify malware signatures. Malware signatures contain data describing characteristics of known malware and are used to determine whether an entity such as a computer file or a software application contains malware. Typically, a set of malware signatures is generated by a provider of security software and is deployed to security software on a user's computer. This set of malware signatures is then used by the security software to scan the user's computer for malware.

During malware signature generation, malware signatures are typically validated against entities that are known to not contain malware, herein referred to as "goodware", in order to ensure that the malware signatures do not generate false positive identifications of malware. In other words, the malware signatures are validated to ensure they do not falsely identify goodware as malware. Typically, a malware signature is first generated by a security administrator then compared to a dataset of goodware in order to determine whether the malware signature generates false positive identifications of malware. Due to the large size of the dataset of all known goodware and the large number of potential malware signatures, comparing malware signatures to a dataset of goodware may be very computationally expensive.

An alternate method of generating malware signatures involves determining the rate at which characteristics occur in the dataset of all goodware. Using this method, malware signatures containing characteristics which have a low rate of occurrence or no occurrence in a dataset of goodware may be generated. However, due to the large set of all possible goodware and the large set of all possible characteristics, it is not tractable to identify and store a rate of occurrence for all characteristics.

Accordingly, there is a need in the art for methods of developing malware signatures with reduced false positive malware detections.

BRIEF SUMMARY

The above and other needs are met by systems, methods, and computer program products for generating a model that specifies a likelihood of observing a characteristic in a set of goodware entities.

One aspect provides a computer-implemented method for generating a model that specifies a likelihood of observing a characteristic in a set of goodware entities. A set of likelihood values associated with a set of characteristics associated with the set of goodware entities is determined, each likelihood value specifying a likelihood of observing a characteristic of the set of characteristics in the set of goodware entities. The set of characteristics is stored in association with the set of likelihood values as a model. A set of relative information gain values associated with the characteristics of the set of characteristics is generated, wherein a relative information gain value describes an amount of information an associated characteristic adds to the model. One or more characteristics are removed from the model responsive to the relative information gain values associated with the one or more characteristics to produce a revised model. The revised model is stored.

Another aspect is embodied as a computer-readable storage medium encoded with computer program code for generating a model that specifies a likelihood of observing a characteristic in a set of goodware entities according to the above described method.

In another aspect, the described embodiments provide a computer system for generating a malware signature for detecting a malware entity. The system comprises a memory and a processor. The system further comprises a goodware dataset stored in the memory, wherein the goodware dataset comprises a set of goodware entities. The system further comprises a goodware model engine stored in the memory and executable by the processor to generate a model that specifies a likelihood of observing a characteristic in the goodware dataset. The system further comprises a malware signature engine stored in the memory and executable by the processor to generate a malware signature for detecting a malware entity including the characteristic responsive to the identified likelihood value associated with the malware characteristic.

The features and advantages described in this summary and the following detailed description are not all-inclusive. Many additional features and advantages will be apparent to one of ordinary skill in the art in view of the drawings, specification, and claims hereof.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
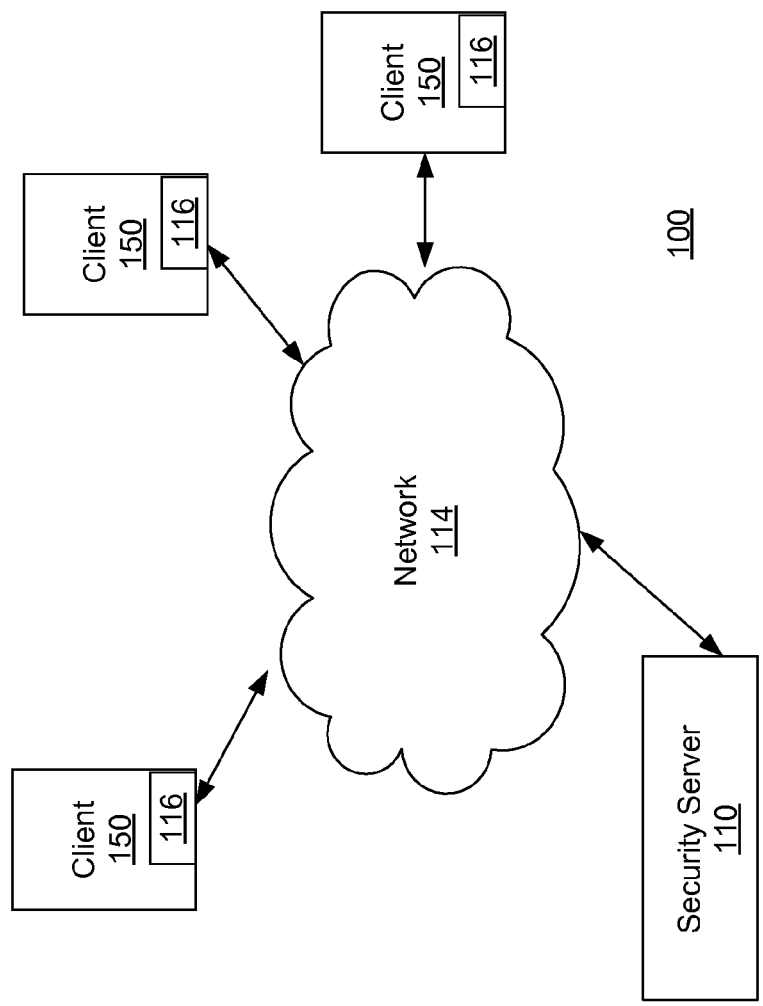
FIG. 1 is a high-level block diagram of a computing environment 100 according to one embodiment.

FIG. 1 is a high-level block diagram of a computing environment 100 according to one embodiment. FIG. 1 illustrates a security server 110 and three clients 150 connected by a network 114. Only three clients 150 are shown in FIG. 1 in order to simplify and clarify the description. Embodiments of the computing environment 100 can have thousands or millions of clients 150 connected to the network 114.

In order to generate a set of malware signatures, the security server 110 generates a goodware sequence probability model from a dataset of known goodware. The goodware sequence probability model specifies a set of characteristics derived from goodware entities and the associated likelihoods of observing the characteristics in goodware. In some embodiments the characteristics are sequences. A sequence, as used herein, refers to an ordered set of one or more data elements, such as computer processor instructions. A sequence can also be a subsequence of a larger sequence. According to the embodiment, the sequences may be derived from the goodware entities through manual and/or automated processes. The majority of the discussion herein is directed to embodiments in which the set of characteristics derived from the goodware entities are bit sequences generated from computer program instructions contained in the goodware entities. Likewise, the set of characteristics derived from malware entities are bit sequences generated from computer program instructions contained in the malware entities.

The security server 110 uses a variety of techniques to minimize the number of sequences in the goodware sequence probability model based on determining the information gain associated with sequences in the model. Information gain, as used herein, refers to a metric which indicates the information value that a given sequence adds to the model. In some embodiments, the security server 110 adds a sequence to the goodware sequence probability model only if the information gain associated with adding the sequence is above a threshold value. The security server 110 further determines whether a sequence can be removed from the goodware sequence probability model based on a relative information gain value that indicates the information gain associated with the sequence relative to a subsequence of the sequence.

The security server 110 further generates a set of malware signatures 116 based on the goodware sequence probability model. Using the goodware sequence probability model, the security server 110 generates a set of malware signatures 116 containing sequences with low or no likelihood of being observed in goodware.

The security server 110 interacts with the clients 150 via the network 114. The security server 110 transmits the set of malware signatures 116 to the clients 150. The clients 150 use the malware signatures 116 in conjunction with security software to identify malware. In one embodiment, the clients 150 execute security software provided by the security server 110 to scan the clients 150 for entities such as software applications or files which correspond to the malware signatures.

In one embodiment, a client 150 is a computer used by one or more users to perform activities including downloading, installing, and/or executing software applications. The client 150, for example, can be a personal computer executing a web browser such as MICROSOFT INTERNET EXPLORER that allows the user to retrieve and display content from web servers and other computers on the network 114. In other embodiments, the client 150 is a network-capable device other than a computer, such as a personal digital assistant (PDA), a mobile telephone, a pager, a television "set-top box," etc. For purposes of this description, the term "client" also includes computers such as servers and gateways that encounter software applications or other entities that might constitute malware or other threats. For example, a client 150 can be a network gateway located between an enterprise network and the Internet.

By excluding sequences that do not provide sufficient measures of information gain from the goodware sequence probability model, the security server 110 generates a goodware sequence probability model that is scalable over the dataset of known goodware. Excluding sequences that do not provide a sufficient information gain further reduces redundancy and spurious results in the goodware sequence probability model. Through the scalable generation of a goodware sequence probability model, sequences associated with a low likelihood of being observed in goodware may be identified and used to generate malware signatures with low rates of false positive detections. Thus, this approach is beneficial in reducing false positive detections of malware in environments where clients 150 are exposed to large amounts of goodware.

The network 114 represents the communication pathways between the security server 110 and clients 150. In one embodiment, the network 114 is the Internet. The network 114 can also utilize dedicated or private communications links that are not necessarily part of the Internet. In one embodiment, the network 114 uses standard communications technologies and/or protocols. Thus, the network 114 can include links using technologies such as Ethernet, 802.11, integrated services digital network (ISDN), digital subscriber line (DSL), asynchronous transfer mode (ATM), etc. Similarly, the networking protocols used on the network 114 can include the transmission control protocol/Internet protocol (TCP/IP), the hypertext transport protocol (HTTP), the simple mail transfer protocol (SMTP), the file transfer protocol (FTP), etc. The data exchanged over the network 114 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

Figure 2:
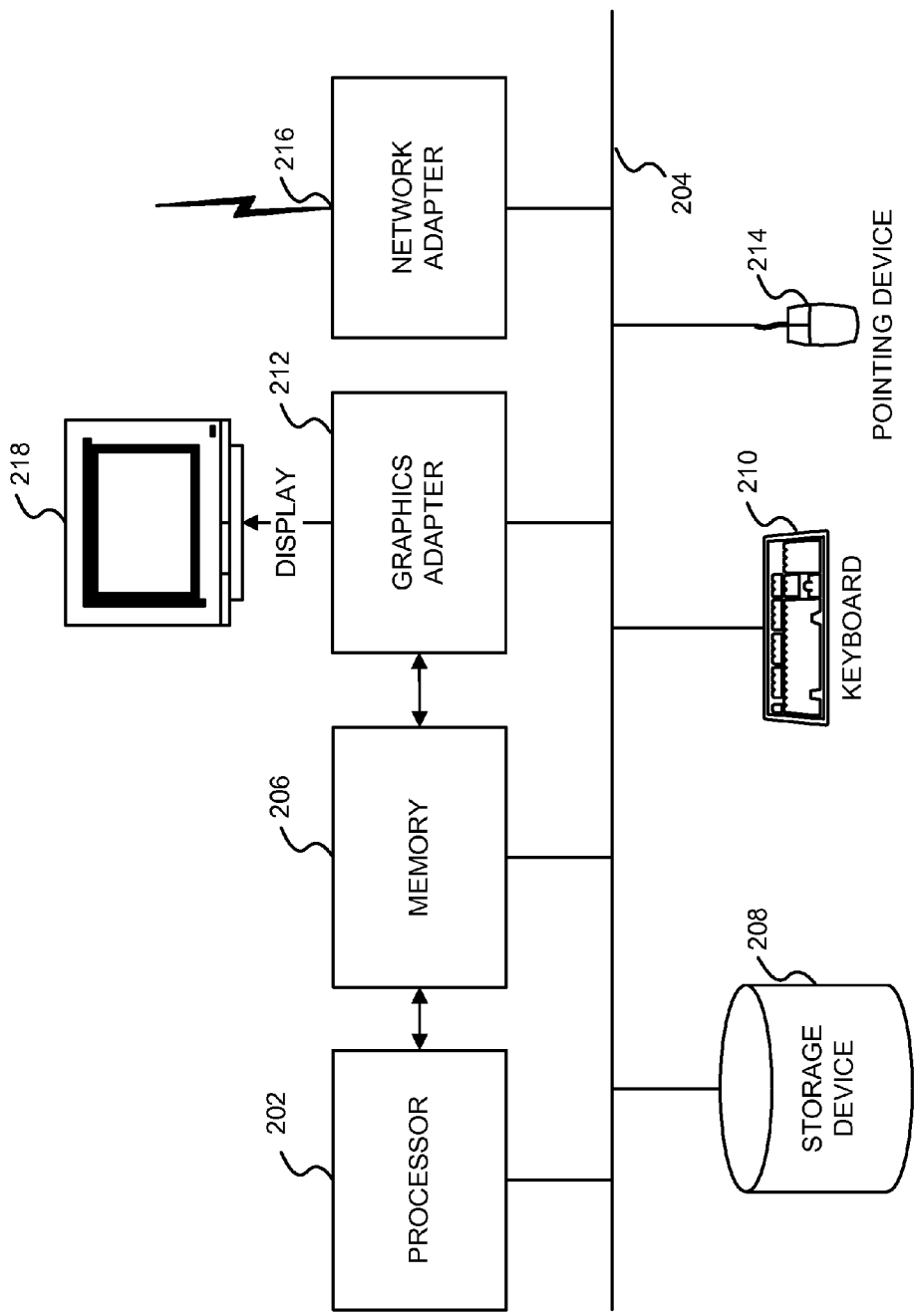
FIG. 2 is a high-level block diagram illustrating a typical computer for use as a security server 110 or a client 150 according to one embodiment.

FIG. 2 is a high-level block diagram illustrating a typical computer 200 for use as a security server 110 or client 150. Illustrated are a processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86 compatible-CPU. The storage device 208 is, in one embodiment, a hard disk drive but can also be any other device capable of storing data, such as a writeable compact disk (CD) or DVD, or a solid-state memory device. The memory 206 may be, for example, firmware, read-only memory (ROM), non-volatile random access memory (NVRAM), and/or RAM, and holds instructions and data used by the processor 202. The pointing device 214 may be a mouse, track ball, or other type of pointing device, and is used in combination with the keyboard 210 to input data into the computer 200. The graphics adapter 212 displays images and other information on the display 218. The network adapter 216 couples the computer 200 to the network 114.

As is known in the art, the computer 200 is adapted to execute computer program modules. As used herein, the term "module" refers to computer program logic and/or data for providing the specified functionality. A module can be implemented in hardware, firmware, and/or software. In one embodiment, the modules are stored on the storage device 208, loaded into the memory 206, and executed by the processor 202.

The types of computers 200 utilized by the entities of FIG. 1 can vary depending upon the embodiment and the processing power utilized by the entity. For example, a client 150 that is a mobile telephone typically has limited processing power, a small display 218, and might lack a pointing device 214. The security server 110, in contrast, may comprise multiple blade servers working together to provide the functionality described herein.

Figure 3:
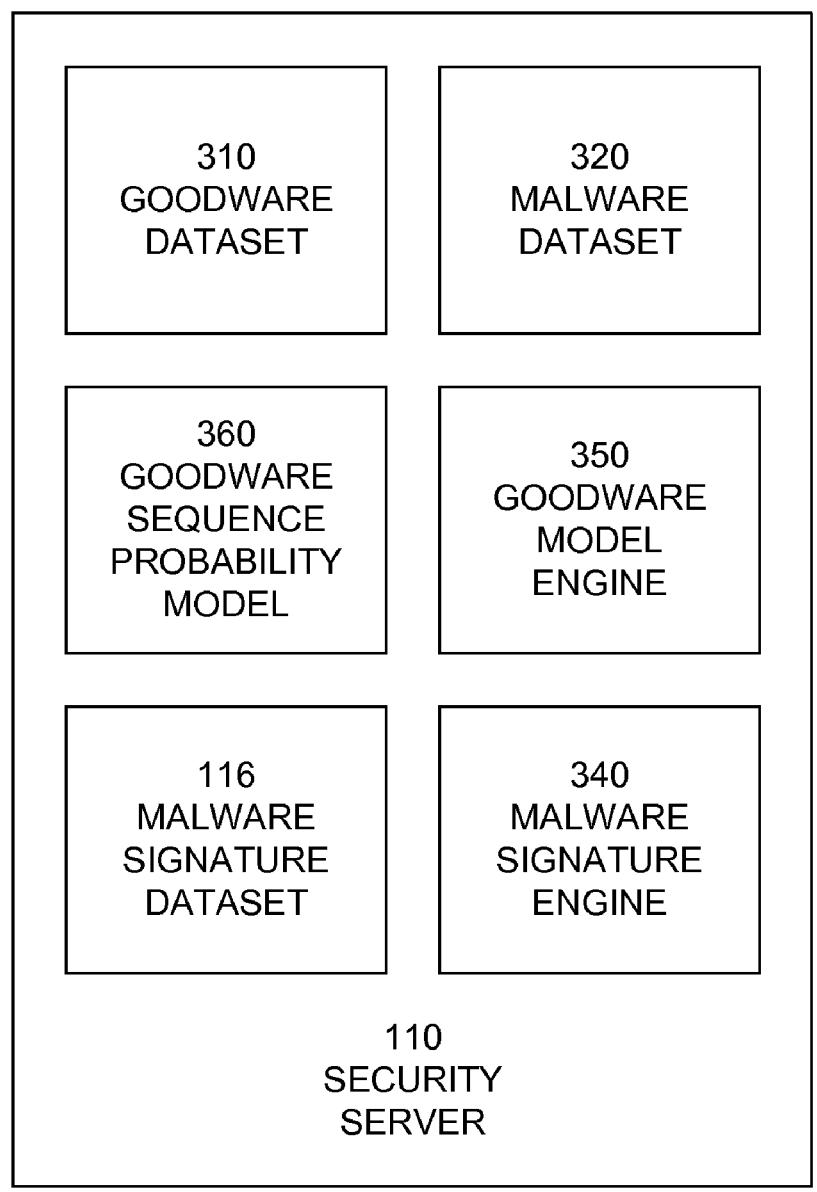
FIG. 3 is a high-level block diagram illustrating a detailed view of the security server 110 according to one embodiment.

FIG. 3 is a high-level block diagram illustrating a detailed view of the security server 110 according to one embodiment. As shown in FIG. 3, the security server 110 includes multiple engines. Those of skill in the art will recognize that other embodiments of the security server 110 can have different and/or other engines than the ones described here, and that the functionalities can be distributed among the engines in a different manner.

The goodware dataset 310 stores a set of known goodware entities. A goodware entity is an entity such as a file or software application that is known not to be malware. The set of goodware entities can range from one goodware entity to millions of goodware entities. The goodware dataset 310 further stores sequences derived from the known goodware entities. Sequences derived from the known goodware may include but are not limited to: hash sequences generated from goodware entities or bit sequences derived from the goodware entity machine code. The goodware dataset 310 stores sequences derived from a goodware entity in association with a unique identifier for the goodware entity.

The malware dataset 320 stores a set of known malware entities. A malware entity is an entity such as a file or application that exhibits malicious behavior such as a computer virus or computer worm. The set of malware entities can range from one malware entity to millions of malware entities. The malware dataset 320 further stores sequences derived from the known malware entities in the same manner that sequences are derived from goodware. The malware dataset 320 stores sequences derived from a malware entity in association with a unique identifier for the malware entity.

The goodware probability model 360 contains a set of sequences derived from known goodware in association with values which represent the likelihood of observing the sequences in goodware. The values which represent the likelihood of observing the sequences in goodware are either based on or equal to the frequencies at which the sequences occur in the goodware dataset 310. The goodware probability model 360 may be stored in any type of associative data structure such as a hash or a database. In a specific embodiment, the goodware probability model 360 is a variable order Markov model and is stored as a trie (i.e. a prefix tree).

The goodware model engine 350 generates the goodware probability model 360 based on the goodware dataset 310. The goodware model engine 350 enumerates the frequency at which a sequence occurs in the goodware dataset 310 in order to determine the likelihood of observing the sequence in goodware. The goodware model engine 350 stores the sequence in association with the likelihood of observing the sequence in the goodware probability model 360. Other functions performed by the goodware model engine 350 are discussed below with respect to FIG. 4.

The malware signature dataset 116 stores a set of signatures used to detect malware. A signature is any characteristic such as a pattern, metadata or sequence associated with an entity that can be used to accurately identify that the entity is malware. In the embodiments discussed herein, the malware signatures contain sequences derived from known malware entities.

The malware signature engine 340 generates malware signatures from sequences derived from known malware entities. For each of the sequences derived from known malware entities, the malware signature engines 340 determines the likelihood for the sequence being observed in goodware based on the goodware sequence probability model 360. If the sequence derived from known malware entities is unlikely to be observed in goodware, e.g., the likelihood of observing the sequence in goodware is below a threshold, then the malware signature engine 340 generates a malware signature based on the sequence. The malware signature engine 340 stores the malware signature in the malware signature dataset 116.

The malware signature engine 340 further functions to transmit the malware signature dataset 116 to the clients 150. According to the embodiment, the malware signature engine 340 may transmit the malware signature dataset 116 to the client 150 when updates are made to the malware signature dataset 116, when the malware signature engine 340 generates and stores a new malware signature in the malware signature dataset 116, and when requested by a client 150.

Figure 4:
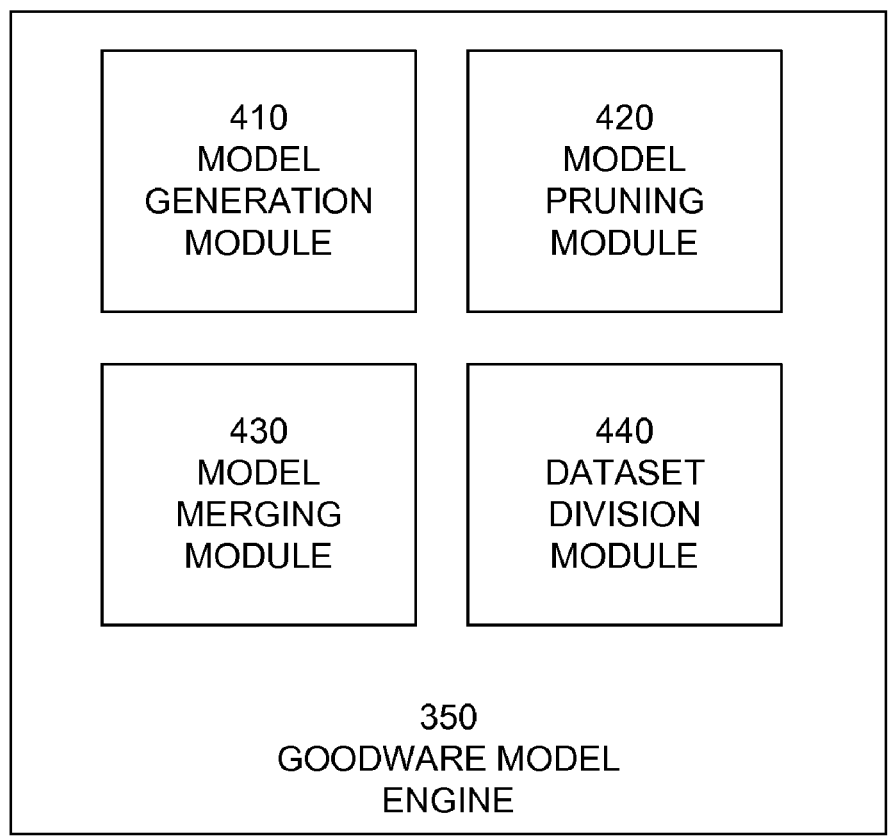
FIG. 4 is a high-level block diagram illustrating a detailed view of the goodware model engine 350 according to one embodiment.

FIG. 4 is a high-level block diagram illustrating a detailed view of the goodware model engine 350 according to one embodiment. As shown in FIG. 4, the goodware model engine 350 includes multiple modules. Those of skill in the art will recognize that other embodiments of the goodware model engine 350 can have different and/or other modules than the ones described here, and that the functionalities can be distributed among the modules in a different manner.

The dataset division module 440 functions to sub-divide the goodware dataset 310 into sub-portions for model generation. Sub-dividing the goodware dataset 310 into sub-portions allows the model generation module 410 to generate a plurality of probability models and combine the probability models to generate a goodware sequence probability model 360. Dividing the goodware dataset 310 into sub-portions is beneficial in instances where the goodware dataset 310 is too large to efficiently generate a single goodware sequence probability model 360. Dividing the goodware dataset 310 into sub-portions also prevents the goodware sequence probability model 360 from being skewed based on the order in which sequences are enumerated to generate the goodware sequence probability model 360. According to the embodiment, the number of sub-portions may be determined based on the size of the dataset or the number of sub-portions may specified by an administrator of the security server 110.

The model generation module 410 functions to generate probability models which specify the likelihood of observing sequences in the goodware dataset 310. In one embodiment, the model generation module 410 generates the goodware sequence probability model 360 based on the goodware dataset 310. In some embodiments, the model generation module 410 generates a plurality of probability models based on sub-portions of the goodware dataset 310.

The model generation module 410 generates probability models by enumerating a number of times a sequence occurs in the goodware dataset 310. The model generation module 410 enumerates the number of times a sequence is observed in the goodware dataset 310 using an associative data structure.

In a specific embodiment, the model generation module 410 enumerates the number of times a sequence is observed using a trie data structure (i.e. a prefix tree data structure). In a trie data structure, each node represents a sequence and each parent node of a child node represents a prefix of the child node sequence. A prefix, as defined herein, is a subsequence of a sequence containing the first ordered data element of the sequence. In this embodiment, the model generation module 410 traverses the trie data structure to find a node which represents the sequence. The model generation module 410 then updates the node to increment an enumeration value which indicates the number of observations of the sequence. The model generation module 410 further updates all the parents of that node to increment their associated enumeration values indicating the number of observations of the subsequences of the sequence. Adding a node representing a sequence to a trie data structure is discussed below with respect to FIG. 5a.

If the model generation module 410 cannot find a node which represents the sequence by traversing the trie data structure, the model generation module 410 finds a path through the trie which represents the majority of the sequence. The model generation module 410 then adds one or more nodes to the trie data structure including a node which represents the sequence and, if necessary, nodes to represent prefixes of the added sequence. The value indicating the number of observations of the sequences represented by added node(s) and their parent node are incremented.

In embodiments which use other types of associative data structures, the model generation module 410 can be generated by adding, for example, one or more elements in the data structure representing the sequence and/or its subsequences. The model generation module 410 then increments the values indicating the number of observations of the added sequences and subsequences of the added sequence.

In some embodiments, the model generation module 410 adds nodes or entries representing a sequence only if the value indicating the number of observations of a prefix of the sequence is above a threshold value. In embodiments where the sequence and prefix and their associated number of observations are stored in a trie data structure, a new child node representing the sequence is added only if the parent node representing the prefix has a number of observations above a threshold value. For instance, a node representing the sequence "abcd" is added to the trie only if the node representing the sequence "abc" has a number of observations above a threshold value (e.g. 5 observations).

According to the embodiment, the model generation module 410 generates values indicating the likelihood of observing the sequences in goodware when all sequences in the goodware dataset 310 have been enumerated or when all sequences in the sub-portion of the goodware dataset 310 have been enumerated. For each sequence, the model generation module 410 generates a value indicating the likelihood of observing the sequence in goodware based on the enumeration value indicating the number of observations of the sequence. The model generation module 410 then store the value indicating the likelihood of observing the sequence in goodware in the probability model. In most embodiments, the model generation module 410 also stores the enumeration value indicating the number of observations of the sequence in association with the sequence in the goodware sequence probability model 360 or probability models generated from the sub-portions of the goodware dataset 310.

The model pruning module 420 functions to remove sequences from the probability models generated from the sub-portions of the goodware dataset 310 and goodware sequence probability model 360 based on their relative information gain. The model pruning module 420 is biased to remove sequences associated with moderately low probabilities of occurring in goodware while retaining sequences with very low probabilities of occurring in goodware. It is desirable to remove the sequences associated with moderately low probabilities of occurring in goodware from the goodware sequence probability model 360 as these sequences are the most likely to generate false positive detections of malware. The model pruning module 420 performs different methods of determining the relative information gains and removes sequences from the probability model according to this bias.

In one embodiment, the model pruning module 420 determines the relative information gain for a sequence based on the ratio between the number of observations of the sequence and the number of observations of a suffix of the sequence. A suffix of a sequence is a subsequence of the sequence which includes the last ordered element of the sequence. For example, for a sequence "abcd" which has 5 observations and a suffix sequence "bcd" with 20 observations, the relative information gain would be the ratio of 20:5 (i.e. 1:4). In another embodiment, the model pruning module 420 determines the relative information gain value based on the absolute value of the difference of the reciprocal value of the probability of observing the sequence and the reciprocal value of the probability of observing a suffix of the sequence. In this embodiment, the relative information gain for the example above would be calculated according to the following formula: $abs(1/p(abcd)-1/p(bcd))$.

The model pruning module 420 removes sequences with relative information gains above a maximum relative information gain value. The model pruning module 420 further removes sequences with relative information gains below minimum relative information gains. The minimum and maximum relative information gains are typically specified by an administrator of the security system 110 but can also be determined through analysis of the relative information gains computed for each sequence in the probability model. In one embodiment, the maximum and minimum information gains may be determined by computing percentile values (e.g. $10^{th}$ and $90^{th}$ percentile values) based on the relative information gains computed for each sequence in the probability model. The model pruning module 420 indicates removed sequences by specifying a value such as a flag at the node or entry of a data structure that represents a prefix of the sequence. In alternate embodiments, the model pruning module 420 removes a sequence from the probability model if both the probability of the sequence and the probability of a suffix of the sequence exceed a defined threshold value.

The model merging module 430 combines probability models generated for different sub-portions of the goodware dataset 310 to generate the goodware sequence probability model 360. In some embodiments, the model merging module 430 may merge multiple probability models using a pairwise method in which the model merging module 430 iteratively selects and merges pairs of probability models. In a specific embodiment, the model merging module 430 first divides a set of probability models into pairs, merges the pairs of probability models to form intermediate models, divides the intermediate models into pairs and merges the intermediate models. The model merging module 430 repeats this process until all the intermediate models have been merged to generate the goodware sequence probability model 360. In some embodiments, the model merging module 430 may perform iterative merging to generate multiple goodware sequence probability models 360. In these embodiments, the model merging module 430 randomizes the selection and merging of the pairs of probability models. The model merging module 430 may then compare the goodware sequence probability models 360 to determine whether the order in which the models were merged has contributed to bias in the goodware sequence probability models 360.

The model merging module 430 compares probability models generated for different sub-portions of the goodware dataset 310 to determine whether the sequences in the probability models correspond. If one of the probability models contains a sequence not included in the other probability model, the model merging model 430 determines whether the sequence has been removed from the probability model by the model pruning module 420. The model merging module 430 identifies a prefix of the sequence and determines whether the node or entry which represents a prefix of the sequence has a value that specifies that the sequence has been removed from the probability model.

If the model merging module 430 determines the sequence has been removed from the probability model, the module merging module 430 generates a value which indicates an approximate likelihood of observing the sequence. The model merging module 430 identifies a value which indicates the likelihood of observing a suffix of the sequence and a value which indicates the likelihood of observing a prefix of the sequence. The model merging module 430 then combines the value which indicates the likelihood of observing a suffix of the sequence and the value which indicates the likelihood of observing a prefix of the sequence to generate the value which indicates an approximate likelihood of observing the sequence. This process is described below with respect to FIG. 6c.

The model merging module 430 combines the values indicating the likelihood of observing a sequence from different probability models generated from different sub-portions of the goodware dataset 310 to generate the goodware sequence probability model. According to the value used to represent the likelihood of observing the sequence, the values may be combined in different ways. In one embodiment, the values used to represent the likelihood of observing the sequence are weighted by the size of the sub-portions of the datasets before combining. The model merging module 360 stores the generated values in association with the sequences in the goodware sequence probability model 360.

Figure 5A:
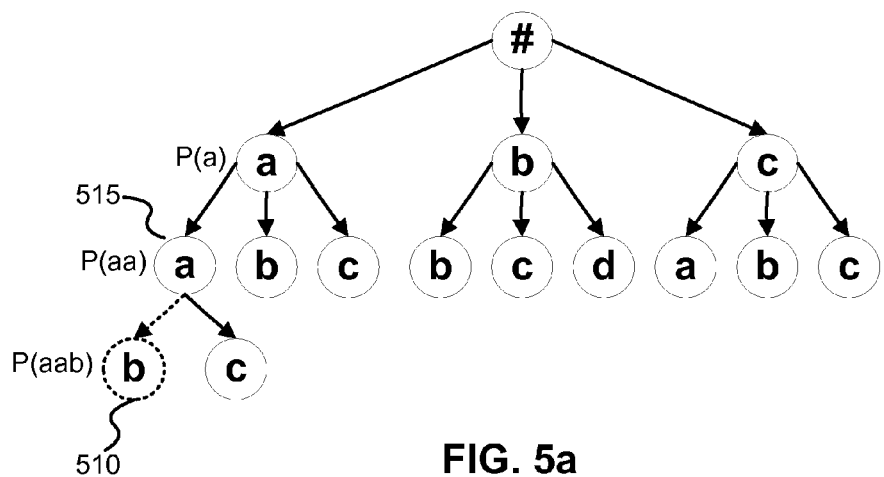
FIG. 5a is a conceptual diagram illustrating goodware sequence probability model generation according to one embodiment.

FIG. 5a is a diagram illustrating the addition of a sequence to the goodware sequence probability model 360. In the embodiment illustrated, the goodware sequence probability model 360 is stored in a trie data structure. In other embodiments, the goodware sequence probability model 360 may be stored using other data structures.

In the embodiment illustrated, each level of the tree represents a sequence of one or more ordered data elements. The levels in the tree correspond to the number of data elements in each sequence. The top level node is a '#' indicating null or a pointer data structure. Child nodes are connected to parent nodes with directed arrows. Child nodes represent the sequence represented in the parent node followed by the data element represented in the child node. The first level nodes represent sequences of one data element {a, b, c}. The second level nodes are child nodes of the first level nodes and represent sequences containing the element represented by the parent node followed by the elements indicated in the second level nodes {aa, ab, ac, bb, bc, bd, ca, cb, cc}. The third level nodes are child nodes of the second level nodes and represent sequences containing the sequence represented by the second level node followed by the elements represented by the third level nodes {aab, aac}.

In the example illustrated, a node 510 representing a previously unobserved sequence 'aab' is added to the goodware sequence probability model 360. Using the trie data structure, the tree is traversed to determine a parent or "prefix" node 515 "aa" to which to add a child node representing the newly observed sequence. In some embodiments, the model generation module 410 determines whether the value indicating the likelihood of observing the parent or "prefix" sequence is above a specific threshold before adding the previously unobserved sequence 'aab' to the goodware sequence probability model 360.

Figure 5B:
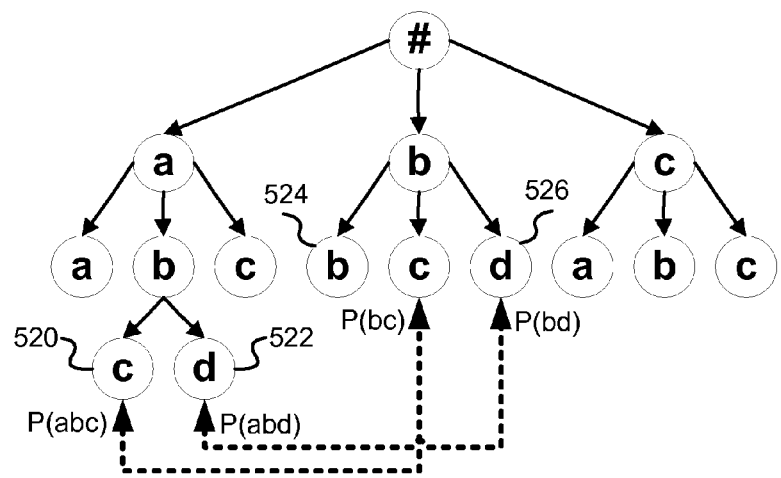
FIG. 5b is a conceptual diagram illustrating goodware sequence probability model pruning according to one embodiment.

FIG. 5b illustrates removing a sequence(s) from the goodware sequence probability model 360 based on the relative information gain provided by the sequence. In the embodiment illustrated, the goodware sequence probability model 360 is stored in a trie data structure. In other embodiments, the goodware sequence probability model 360 may be stored using other data structures.

Nodes representing sequences 'abc' 520 and 'abd' 522 are selected for determining whether the sequences should be removed or "pruned" from the goodware sequence probability model 360 based on their relative information gain. The values p(abc) and p(abd) indicate the likelihood of observing the sequences 'abc' and 'abd'. Nodes representing suffixes of the selected sequences 'bc' 524 and 'bd' 526 and associated values p(bc) and p(bd) indicating the likelihoods of observing the suffix sequences are identified. A relative information gain value is determined based on the ratio of the value indicating the likelihood of observing the sequence and the value indicating the likelihood of observing a suffix of the sequence. In the example illustrated the relative information gain value for 'abc' is the ratio of p(abc) to p(bc). The relative information gain value for 'abd' is the ratio of p(abd) to p(bd).

Based on the relative information gain value, the sequence may be removed from the tree. The model pruning module 430 compares the relative information gain value to maximum and minimum relative information gain values to determine whether to remove the sequence from the goodware sequence probability model 360.

FIGS. 6a-6d illustrate generating a goodware sequence probability model 360 by merging probability models according to one embodiment. In the embodiment illustrated, the probability models are stored in tries or "prefix tree" data structures. In other embodiments, the probability models may be stored using other associative data structures.

Figure 6A:
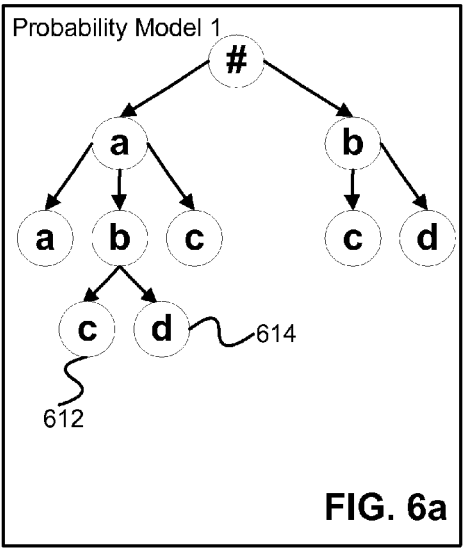
FIGS. 6a-6d are conceptual diagrams illustrating merging two probability models according to one embodiment.
Figure 6B:
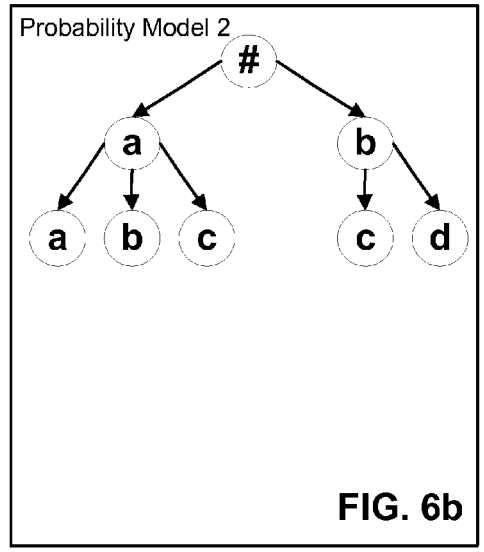

The model merging module 430 combines probability models generated from different sub-portions of the goodware dataset 310 to generate a goodware sequence probability model 360 according to one embodiment. FIG. 6a illustrates probability model 1. FIB 6b illustrates probability model 2. The model merging module 430 compares probability model 1 with probability model 2 to determine whether the sequences specified in probability model 1 correspond to the sequences specified in probability model 2. The model merging model 430 identifies that node sequences 'abc' 612 and 'abd' 614 are included in probability model 1 and not included in probability model 2.

Figure 6C:
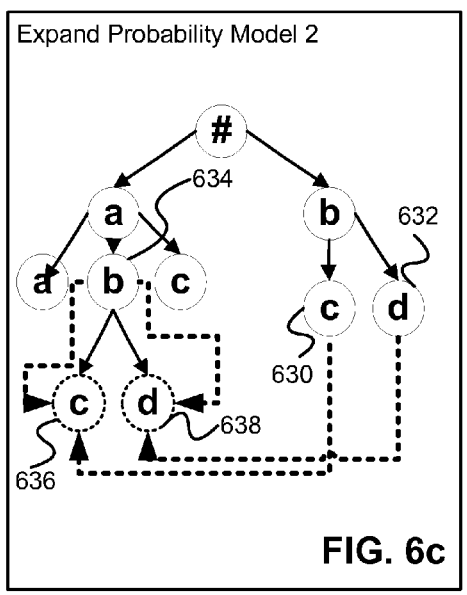

FIG. 6c illustrates the expansion of probability model 2. If the model merging module 430 identifies that the sequences 'abc' and 'abd' have been removed from probability model 2, the model merging module 430 expands probability model 2 by adding nodes or entries to represent 'abd' 636 and 'abc' 638 and generating values which represent the approximate likelihood of observing 'abd' and 'abc'. The model merging module 430 identifies values which represent the likelihood of observing the prefixes of the removed sequences associated with nodes which represent the prefix sequences. In the example illustrated, the values which represent the likelihood of observing prefixes of the removed sequences 'abc' and 'abd' would both correspond to a value p(ab) associated with a node 634 representing the prefix sequence 'ab'. The model merging module 430 identifies values which represent the likelihood of observing suffixes of the removed sequences associated with nodes representing the suffix sequences. In the example illustrated, the nodes representing the suffix sequences 'bc' 630 and 'bd' 632 are associated with the values p(bc) and p(bd), which respectively represent the likelihood of observing suffixes of the removed sequences 'abc' and 'abd'.

The model merging module 430 generate values which represent an approximate likelihood of observing the removed sequences by combining the values which indicate the likelihood of observing a prefix and a suffix of the removed sequences. In the example illustrated, the approximate likelihood of observing 'abc' is computed based on p(ab) and p(bc). The approximate likelihood of observing 'abd' is computed based on p(ab) and p(bd). In some embodiments, the approximate likelihood of observing the sequence is determined by multiplying the likelihood of observing the suffix of the sequence by the likelihood of observing the prefix of the sequence (e.g. p(abc)=p(ab)*p(bc)).

Figure 6D:
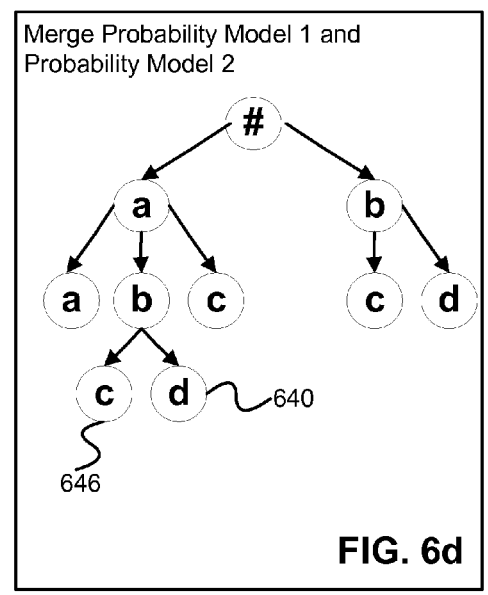

FIG. 6d illustrates a goodware sequence probability model 360 derived by combining probability model 1 and probability model 2. If the same set of sequences are represented in probability model 1 and probability model 2, the model merging engine 340 combines the likelihoods of observing each sequence defined in probability model 1 and probability model 2 to generate combined likelihood values. According to the embodiment, the likelihood values for each sequence can be combined in different ways to generate a combined likelihood value. In the example illustrated, the value p(abc) associated with node 636 in Probability Model 2 is combined with the value p(abc) associated with node 612 in Probability Model 1 to generate a combined likelihood value p(abc) in the goodware sequence probability model 360. The value p(abc) associated with node 638 in Probability Model 2 is combined with the value p(abc) associated with node 614 in Probability Model 1 to generate a combined likelihood value p(abc) associated with node 640 in the goodware sequence probability model 360. In a specific embodiment, the likelihood values are weighted by the size of the datasets used to generate the probability models and then combined to generate the likelihood values. The combined likelihood values are stored in association with the sequences in the goodware sequence probability model 360.

Figure 7:
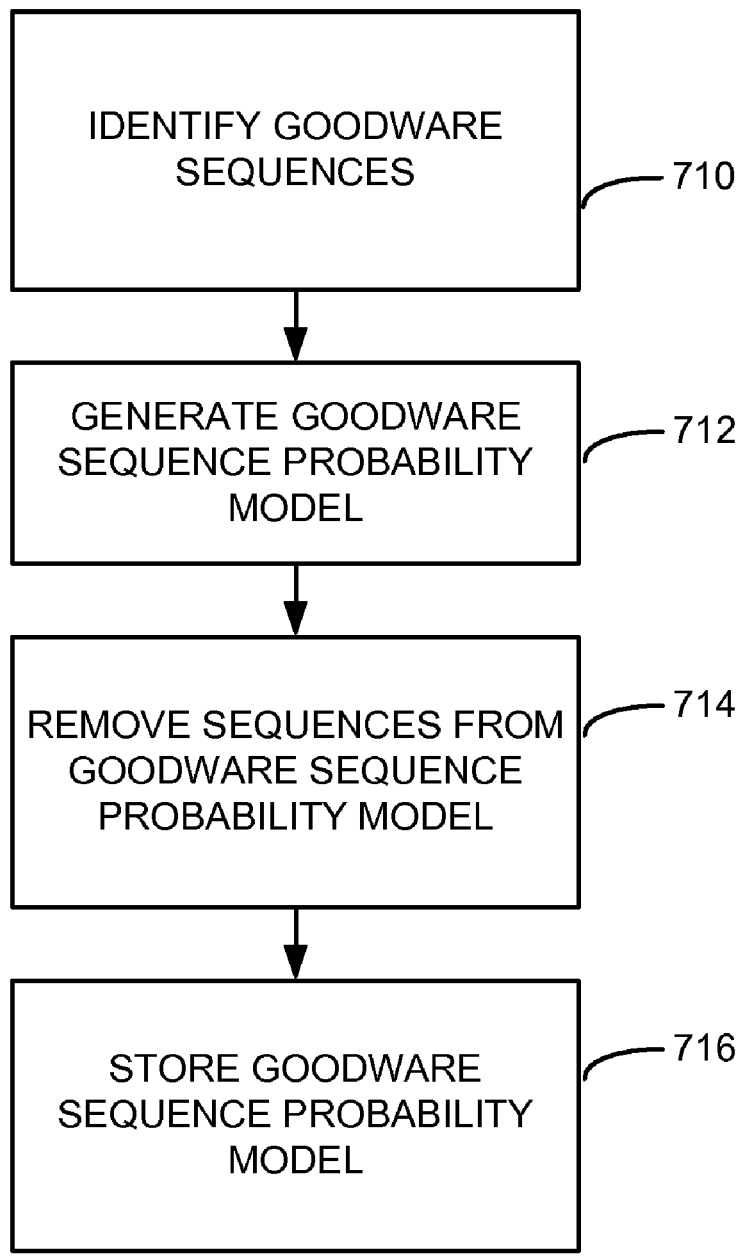
FIG. 7 is a flowchart illustrating steps performed by the goodware model engine 370 to generate a goodware sequence probability model according to one embodiment.

FIG. 7 is a flowchart illustrating steps performed by the goodware model engine 350 to generate a goodware sequence probability model. Other embodiments perform the illustrated steps in different orders, and/or perform different or additional steps. Moreover, some of the steps can be performed by engines or modules other than the goodware model engine 350.

The goodware model engine 350 identifies 710 goodware sequences in the goodware dataset 310. The goodware model engine 350 generates 712 the goodware sequence probability model 360. The goodware model engine 350 removes 714 sequences from the goodware sequence model 360 based the relative information gain values associated with the sequences. The goodware model engine 350 stores 716 the goodware sequence probability model 360 on the security server 110.

Figure 8:
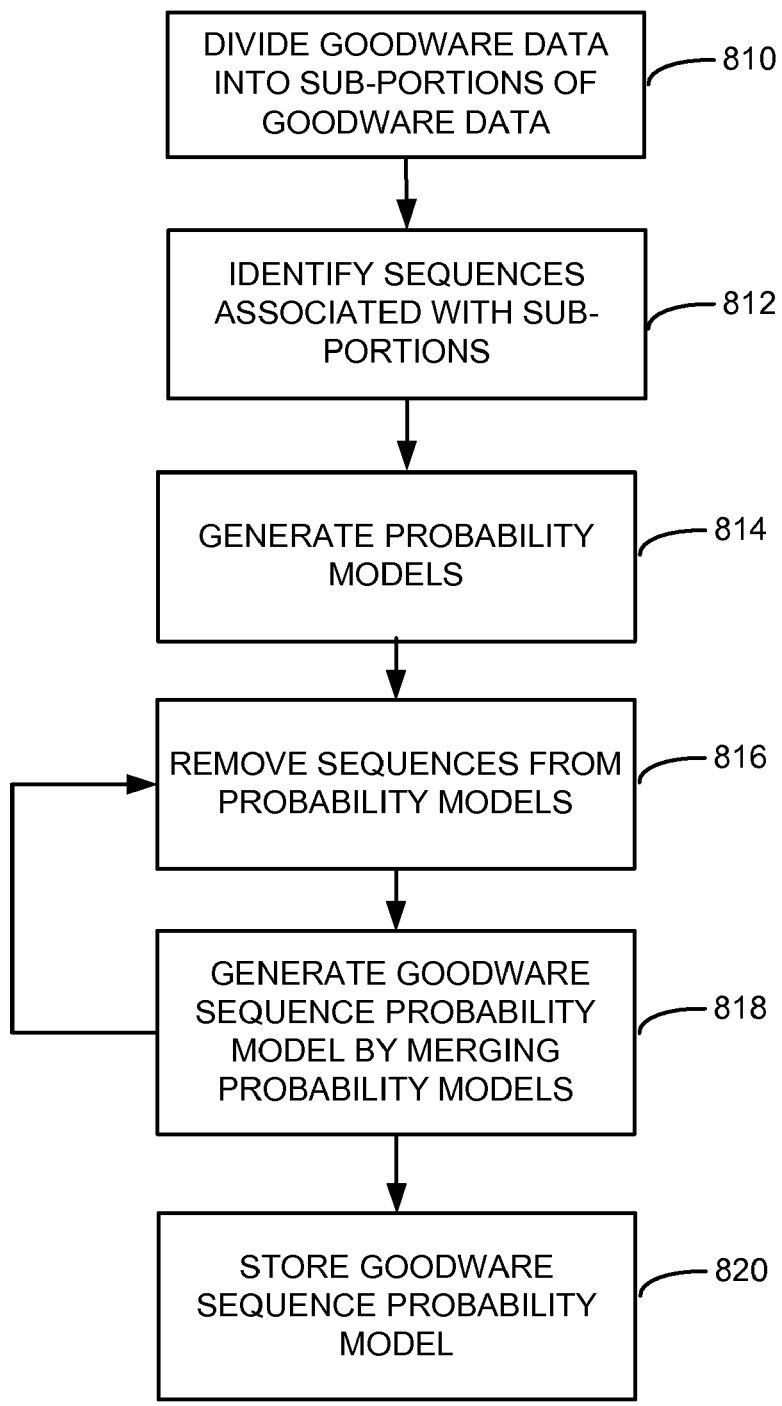
FIG. 8 is a flowchart illustrating steps performed by the goodware model engine 370 to generate a goodware sequence probability model according to one embodiment.

FIG. 8 is a flowchart illustrating steps performed by the goodware model engine 350 to generate a goodware sequence probability model 360. Other embodiments perform the illustrated steps in different orders, and/or perform different or additional steps. Moreover, some of the steps can be performed by engines or modules other than the goodware model engine 350.

The goodware model engine 350 divides 810 the goodware dataset 310 into sub-portions of goodware data. The goodware model engine 350 identifies 812 goodware sequences associated with the sub-portions of the goodware dataset 310. The goodware model engine 350 generates 814 a set of probability models, each probability model is generated based on the sequences associated with sub-portions of the goodware dataset 310. The goodware model engine 350 removes 816 sequences from the set of probability models based on the relative information gain values associated with the sequences. The goodware model engine 35 generates 818 a goodware sequence probability model 360 by merging the set of probability models. In some embodiments, the goodware model engine 350 iteratively removes 816 sequences from the set of probability models and merges 818 the probability models to generate the goodware sequence probability model. The goodware model engine 350 stores 820 the goodware sequence probability model 360 on the security server 110.

Figure 9:
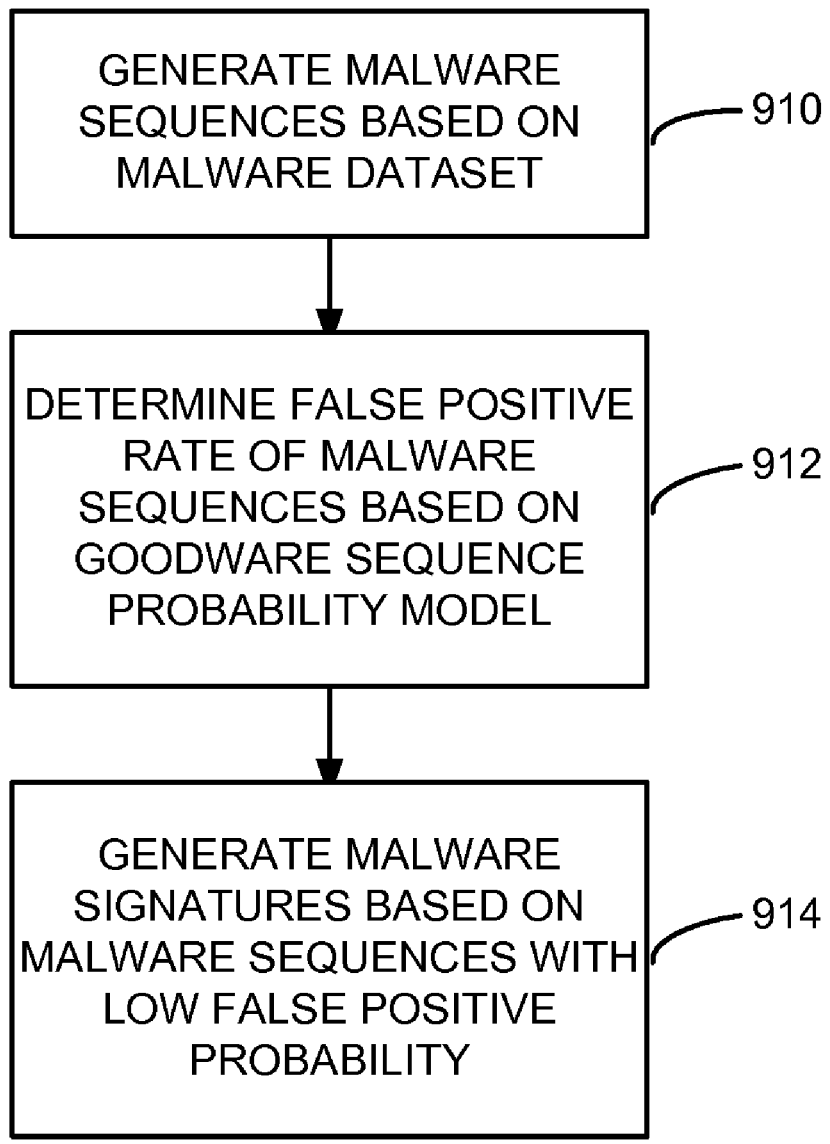
FIG. 9 is a flowchart illustrating steps performed by the malware signature engine 340 to generate a malware signature dataset 116 according to one embodiment.

FIG. 9 is a flowchart illustrating steps performed by the security server 110 to generate the malware signature dataset 116. Other embodiments perform the illustrated steps in different orders, and/or perform different or additional steps. Moreover, some of the steps can be performed by engines or modules other than the security server 110.

The security server 110 generates 910 malware sequences based on the malware dataset 320. The security server 110 determines a false positive rate associated with the malware sequences based on the goodware sequence probability model 360. The security server 110 generates malware signatures based on malware signatures with false positive rates below a specified threshold value. These malware signatures can be distributed to security software at the clients.

The above description is included to illustrate to a security server 110 according to one embodiment. Other embodiments the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A computer-implemented method of generating a model that specifies a likelihood of observing a characteristic in a set of goodware entities, the method comprising:

using a computer to perform steps comprising:
determining a set of likelihood values associated with a set of characteristics associated with the set of goodware entities, each likelihood value specifying a likelihood of observing a characteristic of the set of characteristics in the set of goodware entities, wherein determining the set of likelihood values comprises identifying a set of enumeration values indicating numbers of times characteristics of the set of characteristics are observed in the set of goodware entities, and the likelihood values are based on the set of enumeration values;

storing the set of characteristics in association with the set of likelihood values as a model;

generating a set of relative information gain values associated with the characteristics of the set of characteristics, wherein a relative information gain value describes an amount of information an associated characteristic adds to the model;

removing one or more characteristics from the model responsive to the relative information gain values associated with the one or more characteristics to produce a revised model; and storing the revised model.

2. The method of claim 1, wherein a characteristic in the set of characteristics comprises a sequence derived from a goodware entity.

3. The method of claim 2, wherein the model comprises a trie data structure that represents the sequence.

4. The method of claim 1, wherein a characteristic in the set of characteristics comprises a sequence derived from a goodware entity and storing the set of characteristics in association with the set of likelihood values as a model comprises:

determining a likelihood value associated with a prefix of the sequence;

determining that the likelihood value associated with the prefix is greater than a specified value; and storing the sequence in the model in association with the likelihood value associated with the prefix responsive to determining that the likelihood value is greater than the specified value.

5. The method of claim 1, wherein a characteristic in the set of characteristics comprises a sequence derived from a goodware entity and generating the set of relative information gain values associated with the set of characteristics comprises:

determining a likelihood value associated with a suffix of the sequence; and generating a relative information gain value associated with the sequence based on a likelihood value associated with the sequence and the likelihood value associated with the suffix of the sequence.

6. The method of claim 1, further comprising:

identifying a malware characteristic associated with a malware entity;

identifying a malware likelihood value associated with the malware characteristic based on the model, wherein the malware likelihood value specifies a likelihood of observing the malware characteristic in a goodware entity; and determining whether to include the malware characteristic in a malware signature for detecting the malware responsive to the identified malware likelihood value.

7. The method of claim 1, wherein a goodware entity is an entity that does not contain malware.

8. A non-transitory computer-readable storage medium comprising program code for generating a model that specifies a likelihood of observing a characteristic in a set of goodware entities, the program code comprising program code for:

determining a set of likelihood values associated with a set of characteristics associated with the set of goodware entities, each likelihood value specifying a likelihood of observing a characteristic of the set of characteristics in the set of goodware entities, wherein determining the set of likelihood values comprises identifying a set of enumeration values indicating numbers of times characteristics of the set of characteristics are observed in the set of goodware entities, and the likelihood values are based on the set of enumeration values;

storing the set of characteristics in association with the set of likelihood values as a model;

generating a set of relative information gain values associated with the characteristics of the set of characteristics, wherein a relative information gain value describes an amount of information an associated characteristic adds to the model;

removing one or more characteristics from the model responsive to the relative information gain values associated with the one or more characteristics to produce a revised model; and storing the revised model.

9. The medium of claim 8, wherein a characteristic in the set of characteristics comprises a sequence derived from a goodware entity.

10. The medium of claim 9, wherein the model comprises a trie data structure that represents the sequence.

11. The medium of claim 8, wherein a characteristic in the set of characteristics comprises a sequence derived from a goodware entity and program code for storing the set of characteristics in association with the set of likelihood values as a model comprises program code for:

determining a likelihood value associated with a prefix of the sequence;

determining that the likelihood value associated with the prefix is greater than a specified value; and storing the sequence in the model in association with the likelihood value associated with the prefix responsive to determining that the likelihood value is greater than the specified value.

12. The medium of claim 8, wherein a characteristic in the set of characteristics comprises a sequence derived from a goodware entity and program code for generating the set of relative information gain values associated with the set of characteristics comprises program code for:

determining a likelihood value associated with a suffix of the sequence; and generating a relative information gain value associated with the sequence based on a likelihood value associated with the sequence and the likelihood value associated with the suffix of the sequence.

13. The medium of claim 8, further comprising program code for:

identifying a malware characteristic associated with a malware entity;

identifying a malware likelihood value associated with the malware characteristic based on the model, wherein the malware likelihood value specifies a likelihood of observing the malware characteristic in a goodware entity; and determining whether to include the malware characteristic in a malware signature for detecting the malware responsive to the identified likelihood value associated with the malware characteristic.

14. The medium of claim 8, wherein a goodware entity is an entity that does not contain malware.

15. A computer system for generating a malware signature for detecting a malware entity, the system comprising:

a memory;

a processor;

a goodware model engine stored in the memory and executable by the processor to generate a model that specifies a likelihood of observing a characteristic in a goodware dataset comprising a set of goodware entities; and a malware signature engine stored in the memory and executable by the processor to use the model to determine a likelihood that a characteristic derived from the malware entity is found in the goodware dataset and to generate a malware signature using the characteristic responsive to the likelihood that the characteristic derived from the malware entity is found in the goodware dataset being below a threshold.

16. The system of claim 15, wherein the goodware model engine is further executable by the processor to:

determine set of likelihood values associated with a set of characteristics associated with the set of goodware entities, each likelihood value specifying a likelihood of observing an associated characteristic of the set of characteristics in the set of goodware entities;

store the set of characteristics in association with the set of likelihood values as a model;

generate a set of relative information gain values associated with the characteristics of the set of characteristics, wherein a relative information gain value describes an amount of information an associated characteristic adds to the model; and remove one or more characteristics from the model responsive to the relative information gain values associated with the one or more characteristics to produce a revised model; and store the revised model.

17. The system of claim 15, wherein the characteristic derived from the malware entity comprises a sequence of computer program instructions found within the malware entity.

* * * * *